United States Patent
Moki

(10) Patent No.: US 8,493,756 B2
(45) Date of Patent: Jul. 23, 2013

(54) SWITCHING CONTROL METHOD OF TRANSFORMER COUPLED BOOSTER FOR SUPPRESSING AN INCREASE IN ENERGIZING CURRENT

(75) Inventor: Atsushi Moki, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 92 days.

(21) Appl. No.: 12/934,446

(22) PCT Filed: Mar. 19, 2009

(86) PCT No.: PCT/JP2009/055413
§ 371 (c)(1),
(2), (4) Date: Dec. 9, 2010

(87) PCT Pub. No.: WO2009/122924
PCT Pub. Date: Oct. 8, 2009

(65) Prior Publication Data
US 2011/0103099 A1    May 5, 2011

(30) Foreign Application Priority Data
Mar. 31, 2008    (JP) ................................. 2008-090792

(51) Int. Cl.
  H02M 7/48     (2007.01)
  H02M 3/22     (2006.01)
  H02M 7/5387   (2007.01)
  H02J 1/10     (2006.01)

(52) U.S. Cl.
  USPC ................. 363/71; 363/17; 363/65; 363/132

(58) Field of Classification Search
  USPC ................. 363/65, 71, 72, 132, 16, 17, 130, 363/131, 134
  See application file for complete search history.

(56) References Cited

U.S. PATENT DOCUMENTS 5,771,163 A * 6/1998 Moriguchi et al. ............. 363/71
5,781,419 A * 7/1998 Kutkut et al. ................... 363/17

(Continued)

FOREIGN PATENT DOCUMENTS

DE    196 21 526    8/1997
JP    3-32467      2/1991

(Continued)

OTHER PUBLICATIONS

International Search Report for International Application No. PCT/JP2009/055413 dated May 19, 2009.

(Continued)

*Primary Examiner* — Bao Q Vu
*Assistant Examiner* — Zekre Tsehaye
(74) *Attorney, Agent, or Firm* — Kratz, Quintos & Hanson, LLP

(57) ABSTRACT

Provided is a switching control method of a transformer coupled booster to suppress an increase in energizing current in a transformer of the transformer coupled booster and downsize the transformer coupled booster. A primary coil current that flows through a primary coil of the transformer, and a secondary coil current that flows through a secondary coil of the transformer are detected. The current difference between the detected primary coil current and the detected secondary coil current is calculated. Based on the calculated current difference, the cycle of ON/OFF periods of four arms provided on the transformer coupled booster is maintained at a constant level. Control is carried out so that the ratio of the first arm's ON period to the OFF period is always equal to the ratio of the third arm's ON period to the OFF period.

6 Claims, 10 Drawing Sheets

U.S. PATENT DOCUMENTS

| | | | |
|---|---|---|---|
| 6,370,047 B1 * | 4/2002 | Mallory | 363/65 |
| 6,577,111 B1 | 6/2003 | Dickmander et al. | 323/356 |
| 6,914,794 B2 * | 7/2005 | Watanabe et al. | 363/132 |
| 2011/0002445 A1 * | 1/2011 | Hattrup et al. | 378/101 |

FOREIGN PATENT DOCUMENTS

| | | |
|---|---|---|
| JP | 9-168278 | 6/1997 |
| WO | WO 2007/060998 A1 | 5/2007 |

OTHER PUBLICATIONS

German Office Action issued in counterpart application No. 11 2009 000 738.4-32 with partial English translation (6 pages).

\* cited by examiner

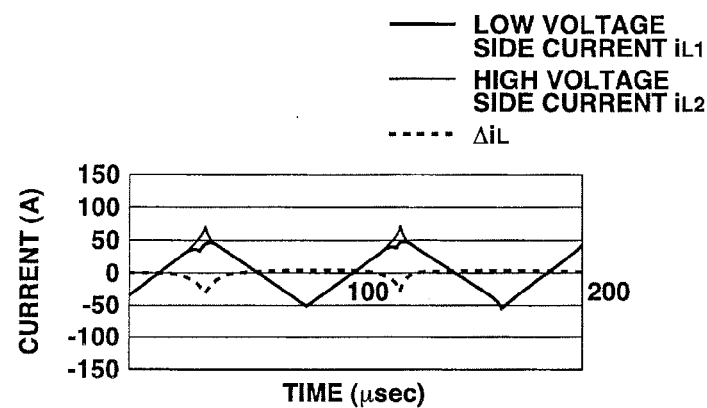
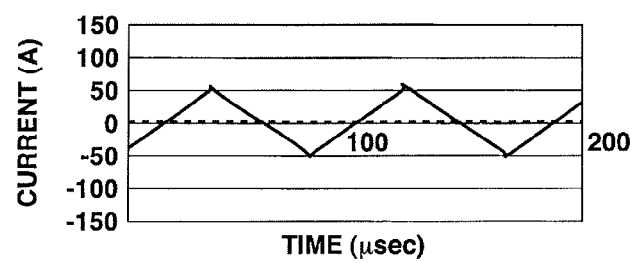
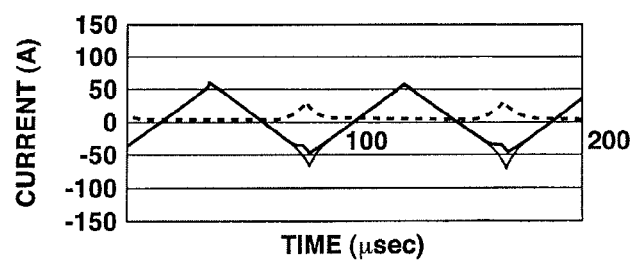
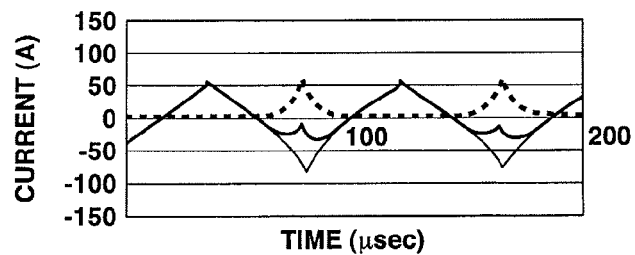
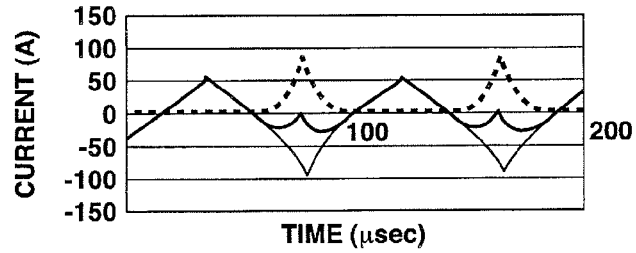

SWITCHING CONTROL METHOD OF TRANSFORMER COUPLED BOOSTER FOR SUPPRESSING AN INCREASE IN ENERGIZING CURRENT

TECHNICAL FIELD

The present invention relates to a switching control method of a booster, and more particularly, to a switching control method of a transformer coupled booster.

BACKGROUND ART

In hybrid construction equipment, a lot of work is to be done repeatedly for a short time. Thus, it is required to use electrically-driven devices such as motors being driven at a high speed with a large output.

To cope with this, employing of a motor having a large size or a storage battery having a large capacitance may be conceived of. However, a problem of securing a space on the vehicle for installing such a large motor or storage battery may occur when a motor having a large size or a storage battery having a large capacitance is employed. To cope with the problem, in a conventional art, it was conceived that an output voltage supplied to the motor is boosted by a booster (see the following patent document 1).
Patent Document 1
WO2007-60998

DISCLOSURE OF THE INVENTION

Problems to be Solved by the Invention

Incidentally, a transformer coupled booster disclosed in the patent document 1 is so configured that a primary side (low voltage side) inverter and a secondary side (high voltage side) inverter are connected by a transformer. In the transformer coupled booster, IGBTs, namely a high-speed switching device, are employed. Switching control for each of the IGBTs is performed by a gate voltage control device that outputs a gate signal to each of the IGBTs.

Usually, a ratio of number of turns for a low voltage side coil and a high voltage side coil is set to one to one, and, by a switching control of the gate voltage control device, value of a current flowing through the low voltage side coil and value of a current flowing through the high voltage side coil are made approximately equal.

In fact, however, there is an instrumental error (variation) in the gate voltage control device that outputs a gate voltage signal to each of the IGBTs. In addition, there is a variation also in each of the IGBTs themselves.

Because of this, when a transformer coupled booster is in operation, the value of a low voltage side current flowing through the low voltage side coil and the value of a high voltage side current flowing through the high voltage side coil are not equal to each other, but there generates a current difference. The current difference appears in the transformer as an energizing current other than a load current. The energizing current is a current for magnetizing transformer cores, and usually has a small current value (several amperes, for example).

FIG. 13 illustrates B-H curve of a transformer core.

In FIG. 13, the horizontal axis represents a magnetic flux density B and the vertical axis represents a magnetic field H.

The magnetic flux density is in promotion to the product of voltage v that has been generated at the low voltage side inverter (or the high voltage side inverter) and time t. The magnetic field H is an energizing current itself and in proportion to the current difference.

As shown in FIG. 13, if a transformer coupled booster is driven ideally, the variation of the magnetic flux density B occurs at the center and in the neighborhood thereof on the B-H curve of the transformer core (region B1). The current difference corresponding to the peak value H1 of the magnetic field H at that time is several amperes.

In fact, however, the variation of the magnetic flux density B deviates from the center and in the neighborhood thereof on the B-H curve of the transformer core, and falls within a magnetic saturation region (region B2) (This is called a biased magnetization.). The current difference corresponding to the peak value H2 of the magnetic field H at that time is, for example, several tens of amperes.

The increase in peak value of the magnetic field H (energizing current) causes the increase in peak current and surge voltage of the transformer and IGBTs, which may result in damage of IGBTs that are used in the transformer coupled booster. Meanwhile, if IGBTs of high rated current and high rated voltage are used in order to prevent the damage of IGBTs, it becomes difficult to downsize the transformer coupled booster.

In view of the foregoing problems, the object of the present invention is to provide a switching control method of a transformer coupled booster to suppress an increase in energizing current in a transformer of the transformer coupled booster and downsize the transformer coupled booster.

Means for Solving the Problems

To achieve that above object, the first invention is a switching control method of a transformer coupled booster, wherein the transformer coupled booster comprises a primary side inverter, a secondary side inverter and a transformer, the primary side inverter including four IGBTs bridging-connected to a primary coil of the transformer, and diodes each connected in parallel to respective one of the IGBTs with polarity thereof being opposite to that of the IGBTs, and being constituted by a first arm that turns ON/OFF two of the IGBTs simultaneously, and a second arm that turns ON/OFF other two of the IGBTs simultaneously, the first arm and the second arm being turned ON/OFF alternately, the secondary side inverter including four IGBTs bridging-connected to a secondary coil of the transformer, and diodes each connected in parallel to respective one of the IGBTs with polarity thereof being opposite to that of the IGBTs, and being constituted by a third arm that turns ON/OFF two of the IGBTs simultaneously, and a fourth aim that turns ON/OFF other two of the IGBTs simultaneously, the third arm and the fourth arm being turned ON/OFF alternately, the primary side inverter being connected in series to the secondary side inverter in such a manner that a positive terminal of the primary side inverter and a negative terminal of the secondary inverter constitute additive polarity, and the primary side inverter being AC-linked to the secondary side inverter by the transformer, the switching control method of a transformer coupled booster comprising:

detecting a primary coil current flowing through the primary coil of the transformer and a secondary coil current flowing through the secondary coil of the transformer, respectively;

calculating a current difference between the detected primary coil current and the detected secondary coil current; and changing ON period and OFF period of the four arms based on the calculated current difference.

In the first invention, the ON period and the OFF period for each of the anus provided in the inverters of the booster are changed based on the current difference between the primary current and the secondary current generated in the transformer coupled booster.

The second invention is characterized in that, in the first invention, a cycle of the ON period and OFF period for each of the arms is maintained constant, and the ON period and the OFF period for each of the arms are changed so that a ratio of the ON period and the OFF period for the first arm S1 always equal to a ratio of the ON period and the OFF period for the third arm.

The third invention is characterized in that, in the second invention, the ON period and the OFF period for each of the arms are changed so that the ON period of the first arm and the third arm decreases when the current difference is larger than a preset threshold current value Ac, the ON period and the OFF period for each of the arms are changed so that the ON period of the first arm and the third arm increases when the current difference is smaller than −Ac, and the ON period of the first arm and the third aim is maintained when the current difference falls within a range between −Ac and Ac.

The second and third inventions will be explained in reference to FIG. 11.

Referring to FIG. 11, firstly, the detected output voltage V0 (i.e., 250V) is fed back, and a phase difference δ between the voltage v1 and voltage v2 is determined. Since the voltage VI and a load are made constant, the phase difference δ is also constant thereafter. Subsequently, under the phase difference δ, each of the arms in an AC link bidirectional DC-DC converter 50A is operated with an initial instruction duty (step S10).

Then, a low voltage side current iL1 and a high voltage side current iL2 generated during the operations of each of the arms are measured, and a current difference ΔiL is calculated by subtracting the high voltage side current iL2 from the low voltage side current iL1, and a peak value of the current difference ΔiL is obtained (step S20).

Then, the process proceeds to either one of the following three steps depending on the magnitude of the peak value of the current difference ΔiL (step S30).

If the peak value of the current difference ΔiL falls within a range between −20A and 20A, the instruction duty of a gate voltage control device 70 is maintained, and the process ends (step S40).

If the peak value of the current difference ΔiL is larger than 20A, a changed ON period is calculated 25 nsec smaller than the ON period corresponding to the existing instruction duty (step S50).

If the peak value of the current difference ΔiL is smaller than −20A, the changed ON period is calculated 25 nsec larger than the ON period corresponding to the existing instruction duty (step S60).

A changed duty corresponding to the calculated changed ON period is input to the gate voltage control device 70 (step S70).

The gate voltage control device 70, to which the changed duty has been input, causes each of the aims of the AC link bidirectional DC-DC converter 50A to be operated with the changed duty being as a new instruction duty. Thereafter, this loop is repeated.

According to the foregoing process, the peak value of the current difference can be closer to a predetermined range each time the process proceeds through the loop. Thus, the duty value with which the peak value of the current difference falls within the predetermined range can be obtained swiftly and easily.

The fourth invention is characterized in that, in the first through third inventions, the change in the ratio of the ON period and the OFF period for each of the aims is carried out all at once by an instruction signal.

In the fourth invention, each of the arms of the AC link bidirectional DC-DC converter 50A is changed all at once by an instruction signal from the gate voltage control device 70 which is externally provided as illustrated in FIG. 2.

Advantageous Effects of the Invention

According to the first through third inventions of the present application, the following advantageous effect is expected.

Since absolute value for the peak value of an energizing current can be suppressed below a predetermined value, damage of IGBTs used in a transformer coupled booster can be prevented reliably.

In addition, since absolute value for the peak value of an energizing current can be suppressed below a predetermined value, rating (withstand voltage characteristics, withstand current characteristics) of IGBTs can be determined in consideration of the predetermined value, and therefore, it is possible to adopt IGBTs without overengineering. As a result, a transformer coupled booster can be downsized.

According to the fourth invention, the duty for each of the arms can be changed all at once by an instruction signal from the gate voltage control device. Therefore, even when, for example, a hybrid construction equipment is being in operation, it is possible to change each duty easily and yet swiftly so that the absolute value for the peak value of the energizing current can always be suppressed below a predetermined value.

BRIEF DESCRIPTION OF THE DRAWINGS

FIG. 7($a$) is a diagram illustrating a voltage waveform of the voltage v1.

FIGS. 9(a) through 9(e) are diagrams illustrating each of the current waveforms for a low voltage side current iL1, a high voltage side current iL2 and a current difference ΔiL with respective instruction duties instructed by the gate voltage control device being adopted as a parameter.

EXPLANATION OF REFERENCE SYMBOLS

V0 voltage of main power source
V1 voltage of storage battery
L leakage inductance of transformer
L0 lead inductance
10 main power source
30 storage battery
50 auxiliary power source
50A AC link bidirectional DC-DC converter
50B low voltage side inverter
50C high voltage side inverter

BEST MODE FOR CARRYING OUT THE INVENTION

Embodiments of the present invention will be described below in reference to the accompanying drawings.

Figure 1:
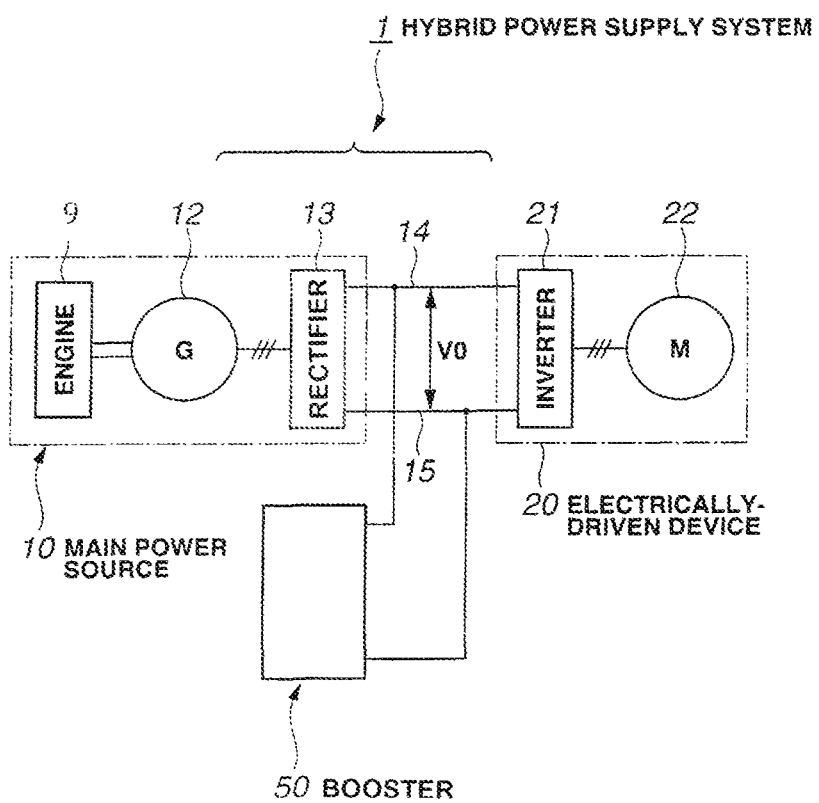
FIG. 1 a diagram illustrating a typical hybrid power supply system for construction equipment.

FIG. 1 is a diagram illustrating a typical hybrid power supply system for construction equipment.

As shown in FIG. 1, a hybrid power supply system 1 comprises a main power source 10, an electrically-driven device 20 and an auxiliary power source 50.

The main power source 10 comprises an engine 9, an electric generator 12 and an rectifier 13. The electrically-driven device 20 comprises an inverter 21 and a motor 22. The rectifier 13 is connected to the inverter 21 via a positive line 14 and a negative line 15. Between the positive line 14 and the negative line 15 is applied voltage V0. The booster 50 comprises an AC link bidirectional DC-DC converter and a storage battery.

Figure 2:
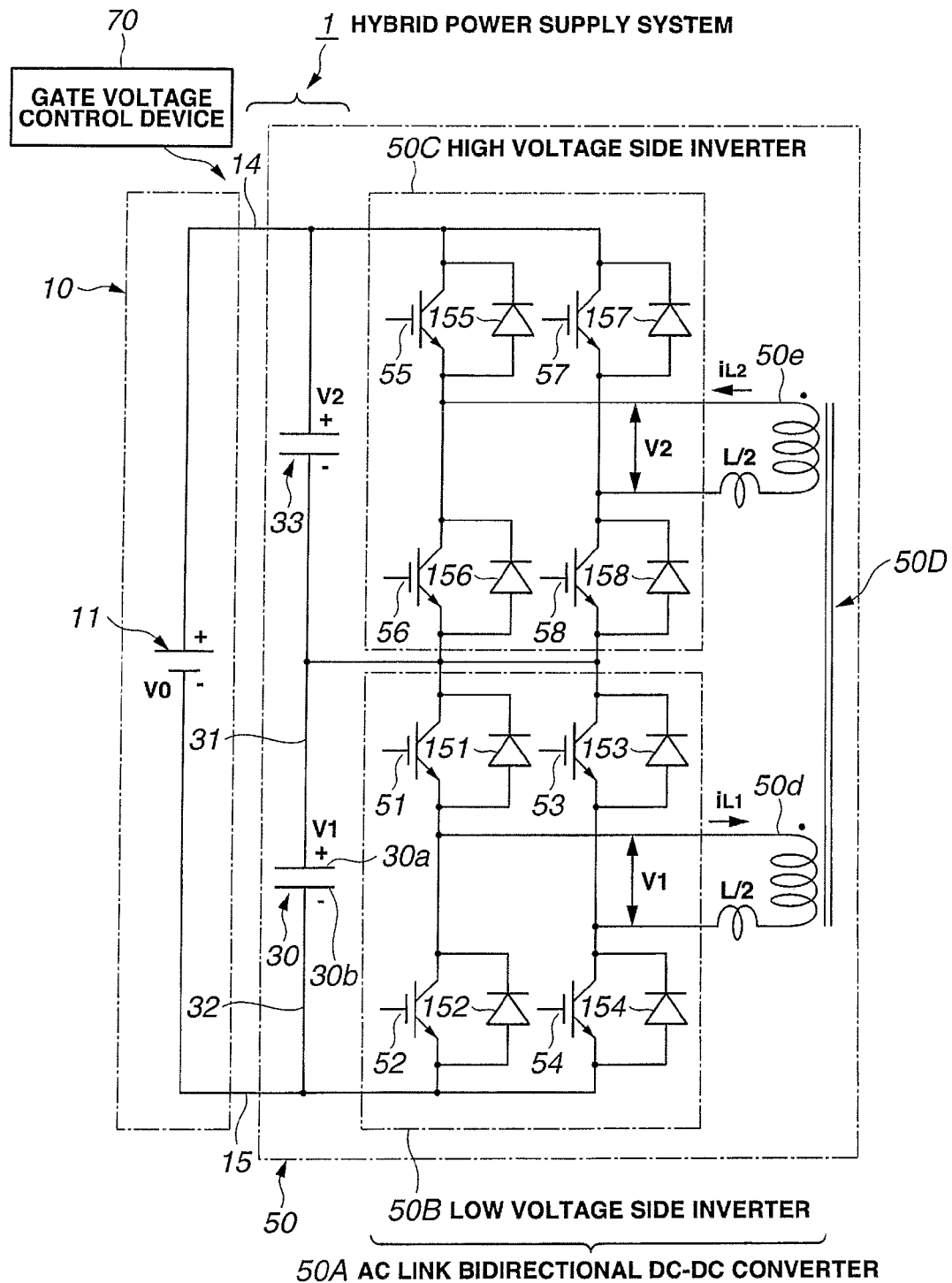
FIG. 2 is a diagram for explaining an AC link bidirectional DC-DC converter to which the present invention is applied.

FIG. 2 is a diagram for explaining an AC link bidirectional DC-DC converter to which the present invention is applied. Incidentally, the voltage of the main power source 10, which is supplied by an electric power generated by a power generating motor via a driver, is equivalently represented by a battery 11.

As shown in FIG. 2, the AC link bidirectional DC-DC converter 50A is configured so that a low voltage side inverter 50B which is a primary side inverter and a high voltage side inverter 50C which is a secondary side inverter are AC-linked by a transformer 50D. In other words, the AC link bidirectional DC-DC converter 50A is a transformer coupled booster.

It is supposed hereinafter that a ratio of number of turns for the low voltage side coil 50d and the high voltage side coil 50e of the transformer 50D is one to one.

The low voltage side inverter 50B is electrically connected in series to the high voltage side inverter 50C so that a positive terminal of the low voltage side inverter 50B and a negative terminal of the high voltage side inverter 50C constitute additive polarity. In other words, the AC link bidirectional DC-DC converter 50A is connected in parallel to the main power source 10 so as to be homopolar.

The low voltage side inverter 50B includes four IGBTs 51, 52, 53 and 54 bridging-connected to a low voltage side coil 50d of the transformer 50D, and diodes 151, 152, 153 and 154 each connected in parallel to respective one of the IGBTs 51, 52, 53 and 54 with polarity thereof being opposite to that of the IGBTs. Here, the bridging-connection is referred to as a connection having a configuration in which one end of the low voltage side coil 50d is connected to the emitter of the IGBT 51 and the collector of the IGBT 52, and the other end thereof is connected to the emitter of the IGBT 53 and the collector of the IGBT 54. The IGBTs 51, 52, 53 and 54 are turned on when a switching signal is applied to their gates, thereby to flow a current from the collector to the emitter.

A positive terminal 30a of a storage battery 30 is electrically connected to a positive electrode of the IGBT 51 via a positive line 31. The emitter of the IGBT 51 is electrically connected to the collector of the IGBT 52. The emitter of the IGBT 52 is electrically connected to a negative terminal 30b of the storage battery 30 via a negative line 32. The negative line 32 is connected to the negative line 15.

In the same manner, the positive terminal 30a of the storage battery 30 is electrically connected to the collector of the IGBT 53 via the positive line 31. The emitter of IGBT 53 is electrically connected to the collector of the IGBT 54. The emitter of IGBT 54 is electrically connected to the negative terminal 30b of the storage battery 30 via the negative line 32.

The emitter of the IGBT 51 (the anode of a diode 151) and the collector of the IGBT 52 (the cathode of a diode 152) are connected to one terminal of the lower side coil 50d of the transformer 50D while the emitter of the IGBT 53 (the anode of a diode 153) and the collector of the IGBT 54 (the cathode of a diode 154) are connected to the other terminal of the lower side coil 50d of the transformer 50D.

The high voltage side inverter 50C includes four IGBTs 55, 56, 57 and 58 bridging-connected to a high voltage side coil 50e of the transformer 50D, and diodes 155, 156, 157 and 158 each connected in parallel to respective one of the IGBTs 55, 56, 57 and 58 with polarity thereof being opposite to that of the IGBTs. Here, the bridging-connection is referred to as a connection having a configuration in which one end of the high voltage side coil 50e is connected to the emitter of the IGBT 55 and the collector of the IGBT 56, and the other end thereof is connected to the emitter of the IGBT 57 and the collector of the IGBT 58. The IGBTs 55, 56, 57 and 58 are turned on when a switching signal is applied to their gates, thereby to flow a current from the collector to the emitter.

The collectors of the IGBTs 55 and 57 are electrically connected to a positive line 14 of the main power source 10 via the positive line 14. The emitter of the IGBT 55 is electrically connected to the collector of the IGBT 56. The emitter of the IGBT 57 is electrically connected to the collector of the IGBT 58. The emitters of the IGBT 56 and 58 are electrically connected to the positive line 31, that is, the collectors of the IGBTs 51 and 53 in the low voltage side inverter 50B.

The emitter of the IGBT 55 (the anode of a diode 155) and the collector of the IGBT 56 (the cathode of a diode 156) are electrically connected to one terminal of the higher side coil 50e of the transformer 50D while the emitter of the IGBT 57 (the collector of a diode 157) and the collector of the IGBT 58 (the cathode of a diode 158) are electrically connected to the other terminal of the higher side coil 50e of the transformer 50D.

A capacitor 33 is electrically connected between the positive line 14 to which the collectors of the IGBTs 55 and 57 are connected and the positive line 31 to which the emitters of the IGBTs 56 and 58 are connected. The capacitor 33 serves to absorb a ripple current.

The transformer 50D has a constant value L of a leakage inductance. The leakage inductance can be obtained by adjusting a gap between the low voltage side coil 50d and the high voltage side coil 50e of the transformer 50D. In FIG. 2, the leakage inductance is divided to be L/2 on the side of the low voltage side coil 50d and L/2 on the side of the high voltage side coil 50e.

(ON/OFF Operation in IGBTs)

Now, explanation is made on ON/OFF operation in the IGBTs. For the sake of convenience on explanation, "ON period" is referred to as a period during which a state is in a turned ON state, and "OFF period" is referred to as a period during which a state is in a turned OFF state.

Figure 3:
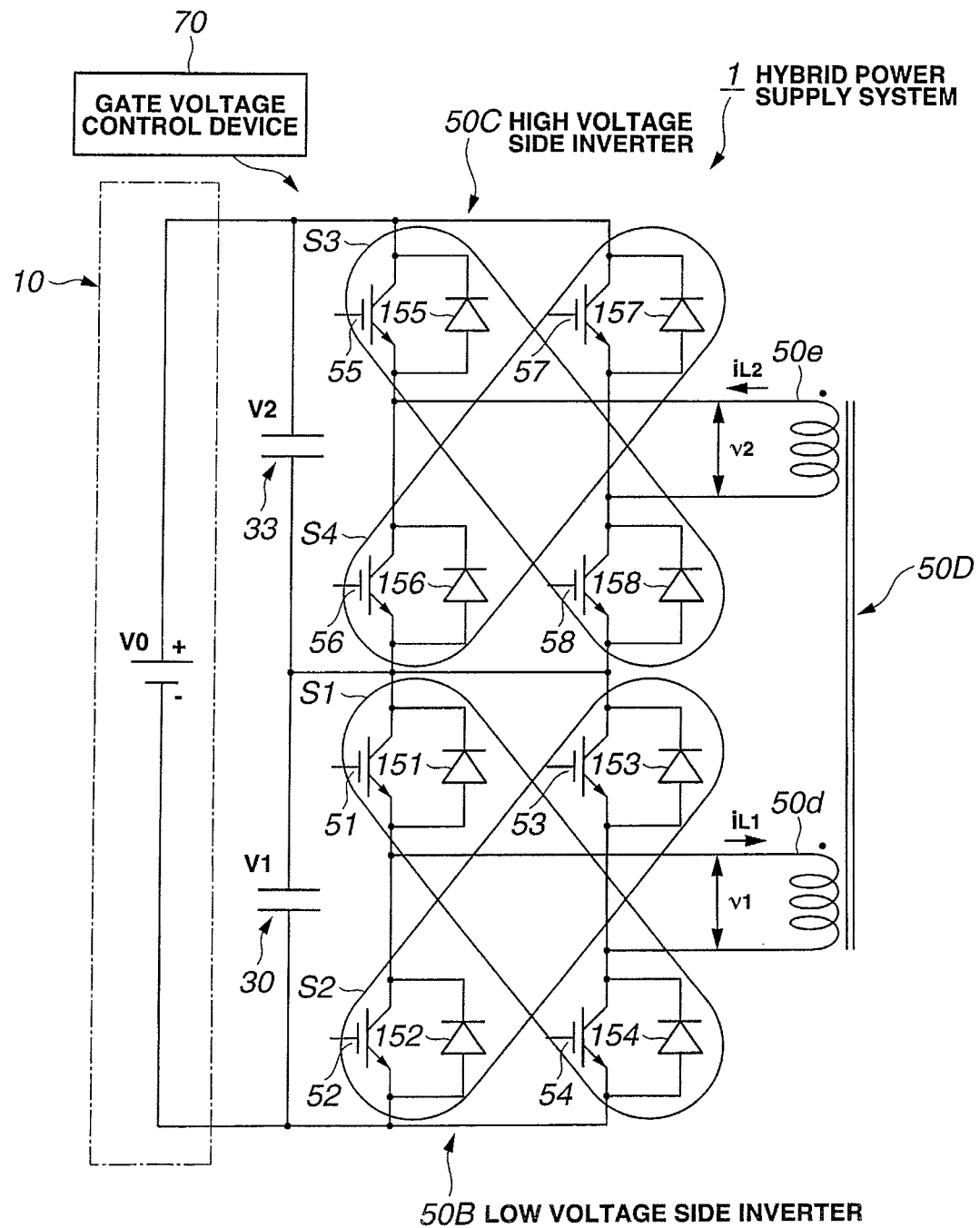
FIG. 3 is a diagram illustrating ON/OFF operations of IGBTs provided at a low voltage side inverter 50B and a high voltage side inverter 50C.

FIG. 3 is a diagram illustrating ON/OFF operations of IGBTs provided at a low voltage side inverter 50B and a high voltage side inverter 50C.

Referring to FIG. 3, in the low voltage side inverter 50B, two IGBTs in a group of the IGBTs 51 and 54 (called "first arm S1" hereinafter) are turned ON/OFF simultaneously. Also, two IGBTs in a group of the IGBTs 52 and 53 (called "second arm S2" hereinafter) are turned ON/OFF simultaneously. The first arm and the second arm are turned ON/OFF alternately. Therefore, the ON period of the first arm S1 is equal to the OFF period of the second arm S2. The OFF period of the first arm S1 is equal to the ON period of the second arm S2.

In the high voltage side inverter 50C, two IGBTs in a group of the IGBTs 55 and 58 (called "third arm S3" hereinafter) are turned ON/OFF simultaneously. Also, two IGBTs in a group of the IGBTs 56 and 57 (called "fourth arm S4" hereinafter) are turned ON/OFF simultaneously. The third arm and the fourth are turned ON/OFF alternately. Therefore, the ON period of the third arm S3 is equal to the OFF period of the fourth arm S4. The OFF period of the third arm S3 is equal to the ON period of the fourth arm S4.

ON/OFF of each of the arms are performed by a instruction signal from an externally-provided gate voltage control device 70.

Each of the arms repeats the ON period and the OFF period at a constant cycle. In addition, control is carried out so that the ON period of the first arm S1 is equal to the ON period of the third arm S3. Therefore, when the ON period of the first arm S1 is set, the OFF period of the first arm S1 is determined. The ON period and the OFF period of the arms other than the first arm S1 also determined automatically.

Typically, in the AC link bidirectional DC-DC converter 50A, the ON/OFF operation in each of the arms is performed with the ON period and the OFF period thereof being set equally.

Hereinafter, the ratio of the ON period relative to the cycle T is called "on-duty", or simply "duty". Also, the ratio of the OFF period relative to the cycle T is called "off-duty". The unit is percent (%). When the duty of the first arm S1 is determined, the duty of the aims other than the first arm S1 is determined automatically.

Figure 4:
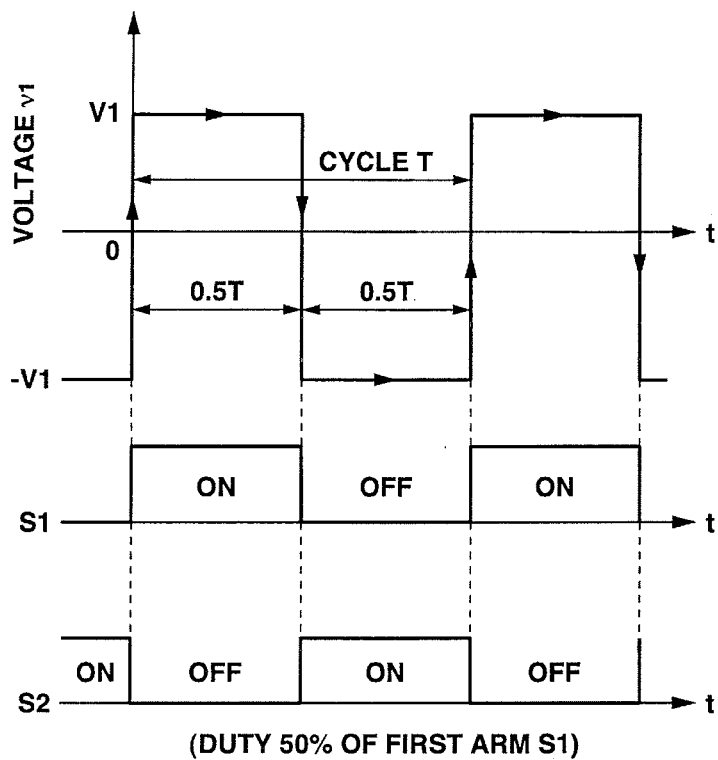
FIG. 4 is a pattern diagram illustrating voltage v1 generated by ON/OFF operations of two arms of the low voltage side inverter 50B.

FIG. 4 is a pattern diagram illustrating voltage v1 generated by the ON/OFF operations of two arms of the low voltage side inverter 50B. It is supposed that the duty of the first arm S1 is 50%. In this case, the duty of the second arm S2 is also 50%.

In FIG. 4, the horizontal axis represents time, and the vertical axis represents voltage V1 generated at both ends of the coil 50d of the transformer 50D.

During a period in which the first arm S1 is being turned ON and the second arm S2 is being turned OFF, the voltage v1 is the voltage V1 of the storage battery 30. On the other hand, during a period in which the first arm S1 is being turned OFF and the second arm S2 is being turned ON, the voltage v1 is −V1. In other words, in the cycle T, the voltage v1 is a positive rectangular voltage V1 in a period of 0.5T, and a negative rectangular voltage V1 in a period of 0.5T.

This is basically the same in the case of the ON/OFF operations of the third arm S3 and the fourth arm S4 of the high voltage side inverter 50C.

(Electric Power Transmission by Switching Control)

Next, electric power transmission between the main power source 10 and the booster 50 will be explained.

In the AC link bidirectional DC-DC converter 50A shown in FIG. 2, the IGBTs in each of the arms undergoes a high-speed switching control, and an electric power is temporarily stored in the leakage inductance having constant value L obtained by adjusting the gap between the low voltage side coil 50d and the high voltage side coil 50e of the transformer 50D. Then, the electric power temporarily stored in the leakage inductance is transmitted from the main power source 10 to the booster 50 (regeneration mode), or from the booster 50 to the main power source 10 (power running mode).

(1) Electric Power Transmission in a Power Running Mode

Referring to FIG. 1, a case is supposed in which the generator 12 and the motor 22 do work to consume electric power. When electric power is consumed, the voltage V0 of the main power source 10 is lowered. From a view point of operability, on the other hand, it is desirable that the voltage V0 of the main power source 10 falls within a certain fixed range.

Therefore, in the power running mode, the phase of the voltage v1 of the low voltage side inverter 50B is made a leading phase relative to the phase of the voltage v2 of the high voltage side inverter 50C.

Figure 5:
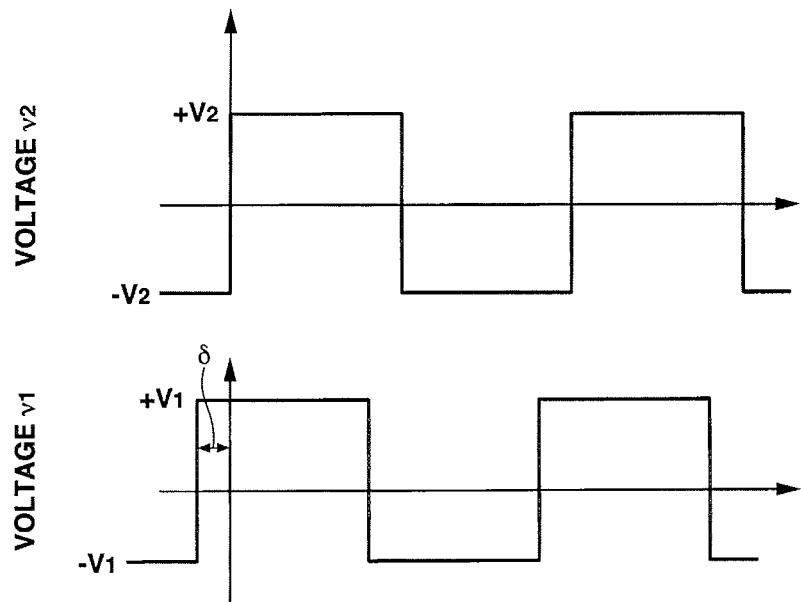
FIG. 5 is a diagram illustrating the relationship between voltage v1 and voltage v2 in a power running mode.

FIG. 5 is a diagram illustrating the relationship between voltage v1 and voltage v2 in the power miming mode.

In FIG. 5, the horizontal axis represents time and the vertical axis represents voltage.

In the power running mode, the voltage v1 is caused to lead by a phase difference δ relative to the voltage v2. The phase difference δ is determined by feeding back the detected voltage V0 and by comparing the voltage V0 with an instructed voltage V0s. In the case of the leading phase, the low voltage side inverter 50B causes electric power to be temporarily stored in the leakage inductance obtained by adjusting the gap between the low voltage side coil 50d and the high voltage side coil 50e. Subsequently, electric power of a high voltage, which is approximately two times higher than the voltage V1 of the storage battery 30 temporarily stored in the leakage inductance, is transmitted to the side of the main power source 10. This enables to suppress the lowering of the voltage V0 of the main power source 10.

(2) Electric Power Transmission in a Regeneration Mode

Referring to FIG. 1, a case is supposed in which the generator 12 and the motor 22 perform slowdown and braking to feed electric power into the power supply system. When electric power is fed, the voltage V0 of the main power source 10 is increased. From a view point of operability, on the other hand, it is desirable that the voltage V0 of the main power source 10 falls within a certain range.

Therefore, in the regeneration mode, the phase of the voltage v1 of the low voltage side inverter 50B is made a lagging phase relative to the phase of the voltage v2 of the high voltage side inverter 50C.

Figure 6:
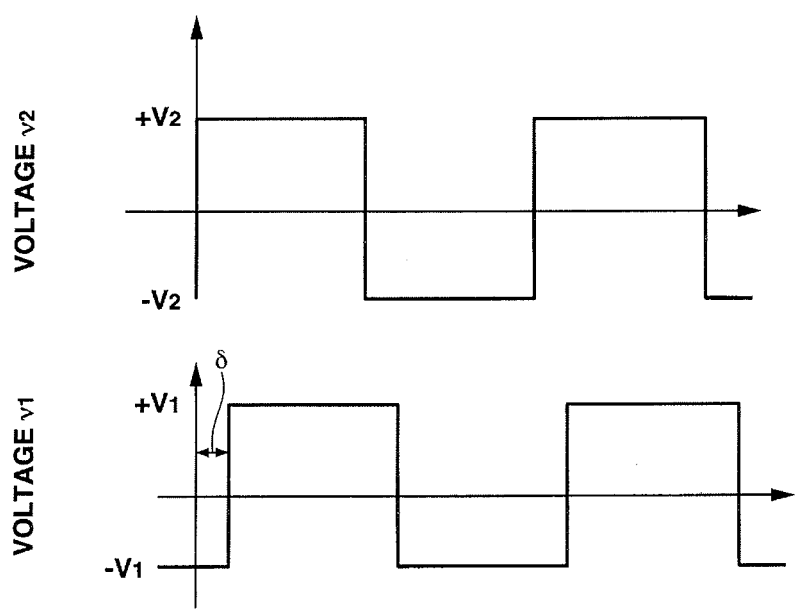
FIG. 6 is a diagram illustrating the relationship between the voltage v1 and the voltage v2 in a regeneration mode.

FIG. 6 is a diagram illustrating the relationship between voltage v1 and voltage v2 in the regeneration mode.

In FIG. 6, the horizontal axis represents time and the vertical axis represents voltage.

In the regeneration mode, the voltage v1 is caused to lag by a phase difference δ relative to the voltage v2. The phase difference δ is determined by feeding back the detected voltage V0 and by comparing the voltage V0 with the instructed voltage V0s. In the case of the lagging phase, the high voltage side inverter 50C causes electric power to be temporarily stored in the leakage inductance. Subsequently, electric power of a low voltage, which is approximately a half of the voltage V0 of the main power source 10 temporarily stored in the leakage inductance, is transmitted to the side of the storage battery 30. This enables to suppress the increase of the voltage V0 of the main power source 10.

For the sake of convenience on explanation, in the below description, a duty that is instructed to the first aim S1 from the gate voltage control device 70 is called "instruction duty." When the instruction duty is determined, on-duty and off-duty for all of the arms are determined automatically.

In FIG. 2, it is supposed that a ratio of the number of turns for the low voltage side coil 50d and the high voltage side coil 50e of the transformer 50D is one to one.

Therefore, supposing that the duty of each of the aims is 50%, the magnitude of a current iL1 that is caused to flow into the low voltage side coil 50d by the voltage v1 generated on the side of the low voltage side inverter 50B should ideally be equal to that of a current iL2 that is caused to flow into the high voltage side coil 50e by the voltage v2 generated on the side of the high voltage side inverter 50C. In this regard, however, the directions of current flow are opposite to each other.

In fact, however, there is an instrumental error (variation) in the gate voltage control device 70 that outputs a gate voltage signal to the IGBTs of each of the arms. In addition, there is a variation in the IGBTs themselves that constitute each of the inverters.

Therefore, the duty of the voltage v1 and the voltage v2 that are generated by the operations of each of the arms is, strictly speaking, not 50%. In other words, the current difference ΔiL between the low voltage side current iL1 and the high voltage side current iL2 generated in the operations of each of the arms, i.e., ΔiL=iL1−iL2, is not equal to zero.

A method of changing duty will be described hereinafter.
(Method of Changing Duty)

Figures 7A, 7B:
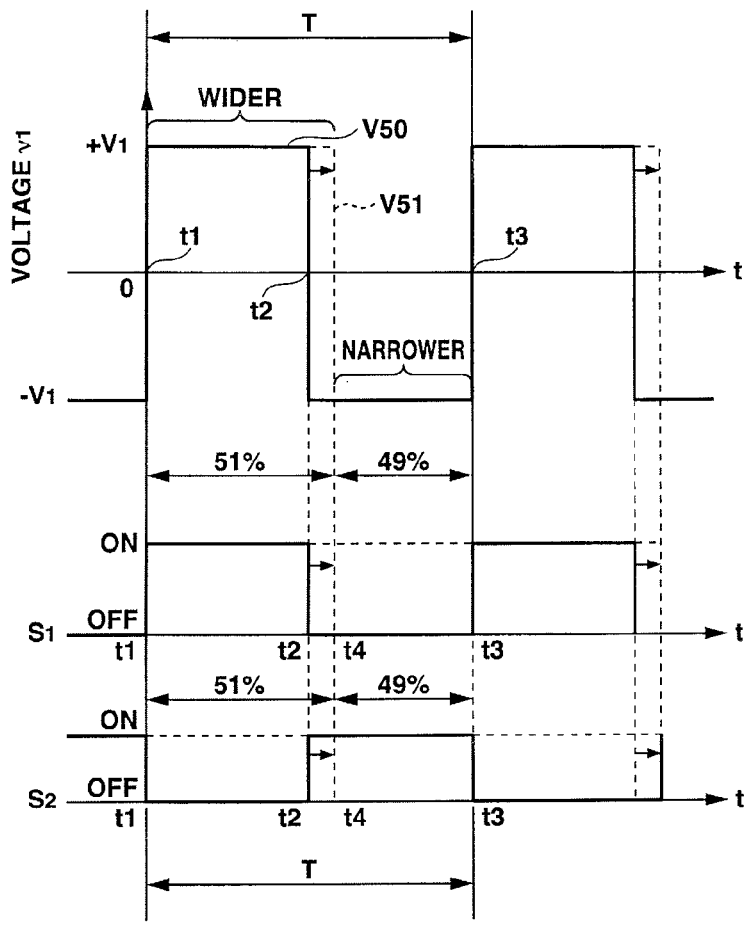
FIG. 7(b) is a diagram illustrating ON/OFF operations of the first arm S1 and the second arm S2 that generate the voltage v1.

FIG. 7(a) is a diagram illustrating a voltage waveform of the voltage v1. FIG. 7(b) is a diagram illustrating ON/OFF operations of the first arm S1 and the second arm S2 that generate the voltage v1.

In FIG. 7(a), the horizontal axis represents time and the vertical axis represents voltage. The voltage v1 takes voltages of V1 and −V1 alternately and repeatedly. Cycle of this is T. In FIG. 7(b), the horizontal axis represents time and the vertical axis represents a timing to become ON or OFF. Since each of the arms repeats ON/OFF with a cycle T, explanation will be made on only a single cycle of T (t1-t3).

Referring to FIG. 7(a), a solid line portion V50 represents a case in which the instruction duty that is instructed from the gate voltage control device 70 to the first arm S1 is 50%. In this case, ON period (t1-t2) and OFF period (t2-t3) of the first arm S1 are equal to each other (=0.5T). OFF period (t1-t2) and ON period (t2-t3) of the first arm S1 are also equal to each other (=0.5T).

If it is desired to increase the duty of the first arm S1 by 1%, a change is made so that the duty of the first aim S1 is 51%, thereby being changed to have the corresponding ON period (t1-t4). Also, it is changed to have the corresponding OFF period (t4-t3).

At the same time, a change is made so that the duty of the second arm S2 is 49%, thereby being changed to have the corresponding ON period (t4-t3).

Also, it is changed so that the off-duty is 51% thereby being changed to have the corresponding OFF period (t1-t4).

The voltage v1 after the change of duty is represented by a dashed line portion V51.

As for a case of changing the duty for the third arm S3 and the fourth arm S4, the case is completely the same as in the case of FIG. 7 except that reference symbols differ.

As described in the foregoing, it is possible to change the duty of each of the arms by the gate voltage control device 70 so that the ON/OFF operations for each of the aims can be performed with the changed duty.

Then, explanation is made on the change of duty in a case where a phase difference is provided between the voltage v1 and the voltage v2.

Figure 8A:
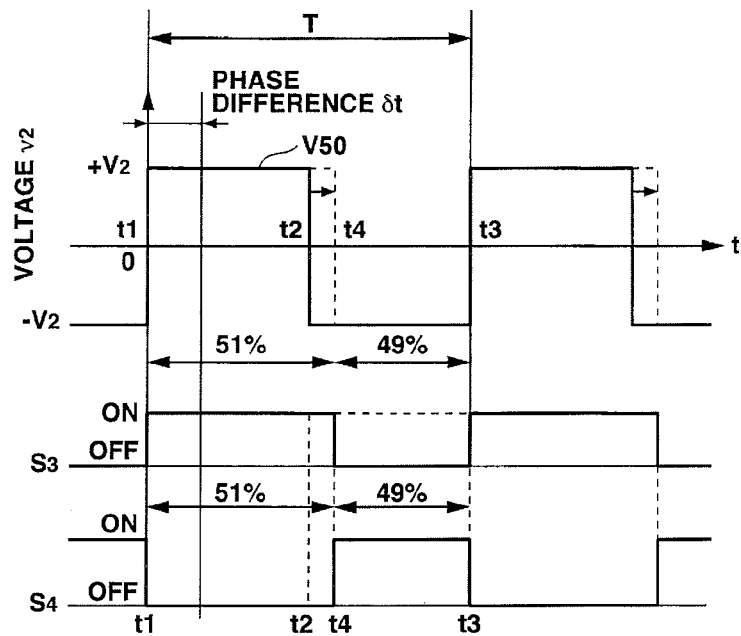
FIG. 8(a) illustrates a voltage waveform of the voltage v1 in the regeneration mode, and ON/OFF timing of the first arm S1 and the second arm S2 at that time.
Figure 8B:
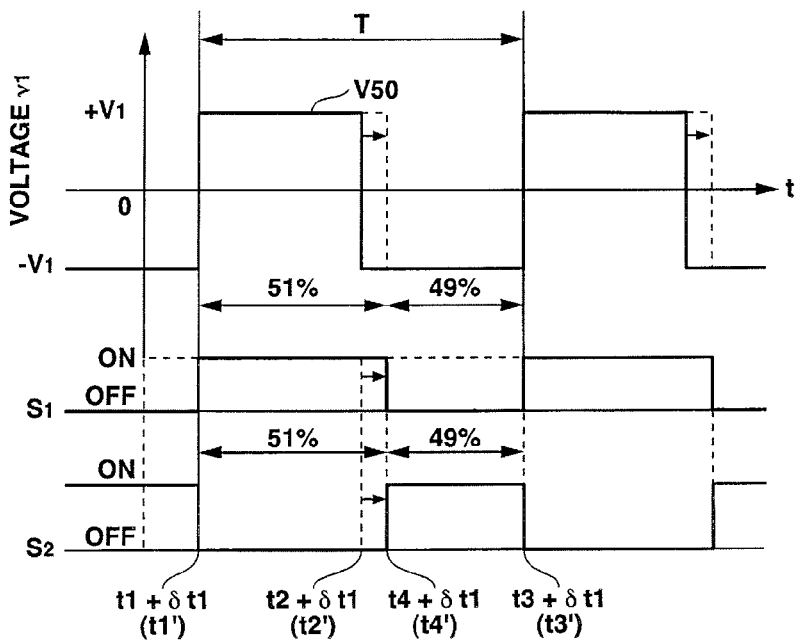
FIG. 8(b) illustrates a voltage waveform of the voltage v2 in the regeneration mode, and ON/OFF timing of the third arm S3 and the fourth arm S4 at that time.

FIG. 8(a) illustrates a voltage waveform of the voltage v1 in the regeneration mode, and ON/OFF timing of the first arm S1 and the second arm S2 at that time. FIG. 8(b) illustrates a voltage waveform of the voltage v2 in the regeneration mode, and ON/OFF timing of the third arm S3 and the fourth arm S4 at that time. In FIG. 8(a), the solid line portion V50 represents a voltage waveform with duty 50%. In FIG. 8(b), the solid line portion V50 represents a voltage waveform with duty 50%.

The voltage v1 has a lagging phase relative to the voltage v2. Explanation will be made below on a case where the duty of the voltage v1 and the voltage v2 is changed from 50% to 51% while the phase difference is maintained.

Referring to FIG. 8(a), in the case of the voltage v2, the ON period (t1-t2) and the OFF period (t2-t3) that the gate voltage control device 70 instructs to the third arm S3 are equal to each other (=0.5T). The OFF period (t1-t2) and the ON period (t2-t3) that is instructed to the fourth arm S4 are also equal to each other (=0.5T).

If it is desired to increase the duty of the third arm S3 by 1%, the duty of the third arm S3 is set to 51%, thereby being changed to have the corresponding ON period (t1-t4). Also, the off-duty is set to 49%, thereby being changed to have the corresponding OFF period (t4-t3).

At the same time, the duty of the fourth aim S4 is set to 49%, thereby being changed to have the corresponding ON period (t4-t3). Also, the off-duty is set to 51%, thereby being changed to have the corresponding OFF period (t1-t4).

Referring to FIG. 8(b), the voltage v1 has a voltage waveform that is shifted rightward along the time axis by a phase time δt that corresponds to the phase difference δ relative to the waveform of the voltage v2. Hereinafter, time shifted, for example, from t1 to t1+δt is represented by t1'. This applies to a case other than the embodiment.

If it is desired that the duty of the second arm S2 is to be increased by 1%, the duty of the first arm S1 is set to 51%, thereby being changed to have the corresponding ON period (t1'-t4'). And, the off-duty is set to 49%, thereby being changed to have the corresponding OFF period (t4'-t3').

At the same time, the duty of the second arm S2 is set to 49%, thereby being changed to have the corresponding ON period (t4'-t3'). And, the off-duty is set to 51%, thereby being changed to have the corresponding OFF period (t1'-t4').

Basically, the same steps as in the regeneration mode are taken in the power running mode. Therefore, the explanation on the power running mode is omitted.

Incidentally, for the sake of a simple explanation, the duty is changed while the phase difference δ is maintained in FIG. 8. For example, the instruction duty can be changed while the voltage V0 is detected, the detected V0 is fed back, and the phase difference δ between the voltage v1 and the voltage v2 is changed. In that case, the phase difference δ may be changed to the phase difference δ', thereby being changed to the phase time δt' corresponding to the phase difference δ' in FIG. 8.

(Relationship Between the Duty and the Current Difference ΔiL)

Then, experiments conducted by using the above-described method of changing duty and results of the experiments will be described.

FIGS. 9(a) through 9(e) are diagrams illustrating current waveforms for a low voltage side current iL1, a high voltage side current iL2 and a current difference ΔiL with respective instruction duties instructed by the gate voltage control device being adopted as a parameter.

In FIG. 9, the horizontal axis represents a time (μsec) and the vertical axis represents an electric current (A). The low voltage side current iL1 is shown in a thick solid line, the high voltage side current iL2 is shown in a thin sold line, and the current difference ΔiL is shown in a thick broken line. The operation condition is no phase difference and unloaded.

The low voltage side current iL1 and the high voltage side current iL2 were measured by current sensors respectively disposed in the neighborhood of the low voltage side coil 50d and the high voltage side coil 50e shown in FIG. 2. Depending on circumstances, the difference between the low voltage side current iL1 and the high voltage side current iL2 may be measured by a clamp meter by utilizing the fact that the low voltage side current iL1 and the high voltage side current iL2 flow in directions opposite to each other. In this case, the current difference ΔiL can be obtained directly.

FIG. 9(a) illustrates a case in which the instruction duty of the gate voltage control device 70 is 49.89%. Amplitude of current is greater in the high voltage side current iL2 than in the low voltage side current iL1. The peak value of the current difference ΔiL is approximately −30A.

FIG. 9(b) illustrates a case in which the instruction duty of the gate voltage control device 70 is 49.94%. Current waveform is approximately the same in the low voltage side current iL1 and in the high voltage side current iL2. The peak value of the current difference ΔiL falls within several amperes.

FIG. 9(c) illustrates a case in which the instruction duty of the gate voltage control device 70 is 50.00%. Amplitude of current in a negative side is grater in the high voltage side current iL2 than in the low voltage side current iL1. The peak value of the current difference ΔiL is approximately 27A.

FIG. 9(d) illustrates a case in which the instruction duty of the gate voltage control device 70 is 50.06%. Amplitude of current in a negative side is grater in the high voltage side current iL2 than in the low voltage side current iL1. The peak value of the current difference ΔiL is approximately 60A.

FIG. 9(e) illustrates a case in which the instruction duty of the gate voltage control device 70 is 50.11%. Amplitude of current in a negative side is grater in the high voltage side current iL2 than in the low voltage side current iL1. The peak value of the current difference ΔiL is approximately 75A.

Figure 10:
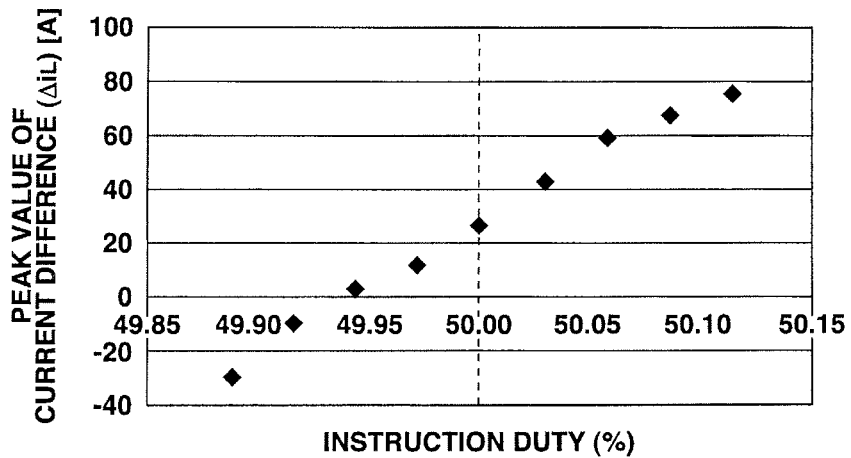
FIG. 10 is a diagram illustrating the relationship between the instruction duty corresponding to the peak value of the current difference ΔiL and the peak value in FIG. 9.

FIG. 10 is a diagram illustrating the relationship between the instruction duty corresponding to the peak value of the current difference ΔiL and the peak value in FIG. 9. In FIG. 9, the horizontal axis represents an instruction duty (%) and the vertical axis represents a current (A).

As shown in FIG. 10, the relation of the peak value of the current difference relative to the instruction duty can be expressed in an approximately linear curve having a positive inclination. In FIG. 10, an instruction duty at which the absolute value of the peak value is minimum is approximately 49.94%. Therefore, it can be seen that if the instruction duty of the gate voltage control device 70 is changed from the initially-set 50% to 49.94%, the peak value of the energizing current can be suppressed from the peak value of 27A to several amperes or lower.

Incidentally, the relationship between the instruction duty and the peak value of the current difference is obtained by a combination of a specific gate voltage control device 70 and a specific AC link bidirectional DC-DC converter 50A. Therefore, other combinations would show different characteristics from the case in FIG. 9. In other words, in the case of other combinations, it is necessary to obtain an optimal instruction duty anew.

From now, an Embodiment of the present invention will be described based on the aforementioned method of changing duty and relationship between the instruction duty and the peak value.

Embodiment 1

Referring to FIG. 10, the peak value of the current difference ΔiL monotonically increases relative to the instruction duty.

Therefore, in Embodiment 1, the change of the instruction duty is performed in the following course.

a. In the case where the peak value of the current difference ΔiL is larger than a threshold value Ac, the instruction duty is changed so as to be smaller than an existing instruction duty for the purpose of decreasing the current difference ΔiL.

b. In the case where the peak value of the current difference ΔiL is smaller than −Ac, the instruction duty is changed so as to be larger than an existing instruction duty for the purpose of increasing the current difference ΔiL.

c. In the case where the current difference ΔiL falls within a range between −Ac and Ac, an existing instruction duty is not changed, but maintained.

Figure 11:
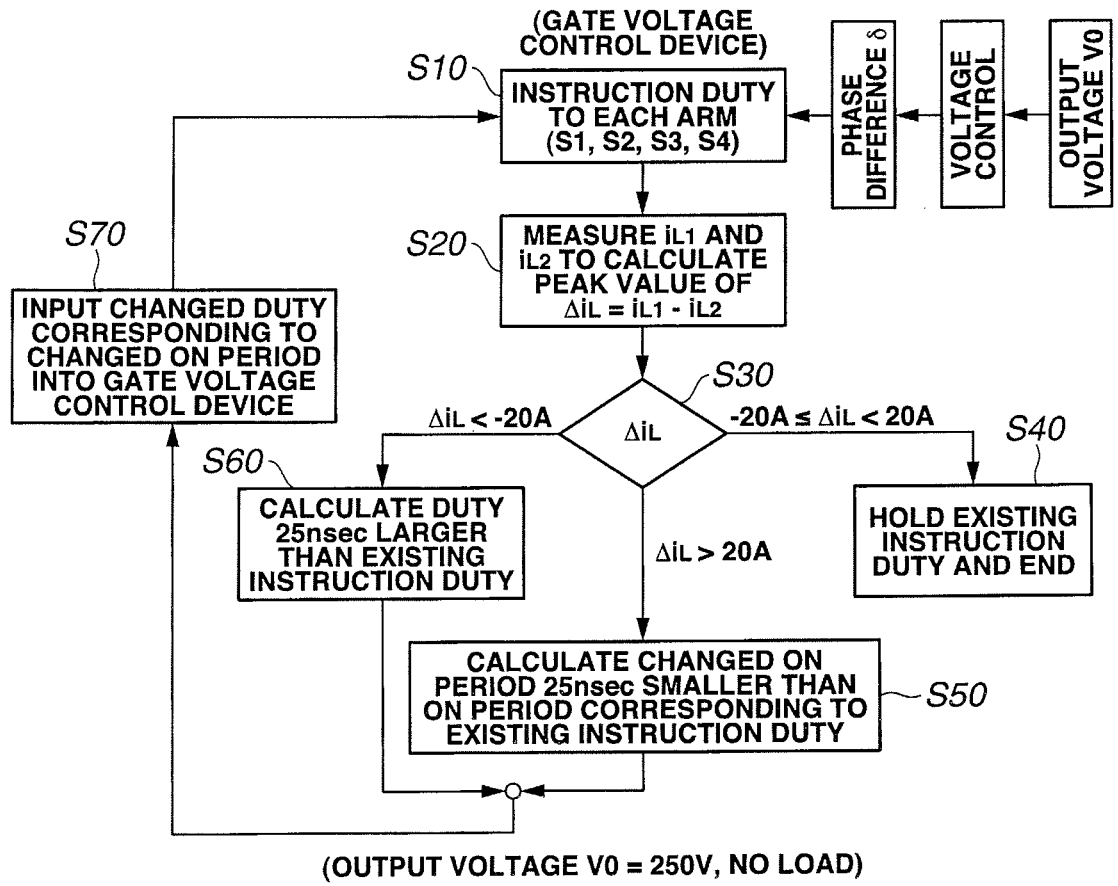
FIG. 11 is a process chart of Embodiment 1.

FIG. 11 is a process chart of Embodiment 1 where the present invention is applied to the AC link bidirectional DC-DC converter 50A. It should be noted that Embodiment 1 is suited for the case where the adjustment is performed only once, for example, at the time of inspection.

The process of the instruction duty change is performed under a constant operational condition. For example, the output voltage V0 is set to a constant value of 250V.

Firstly, a detected output voltage V0 (250V in this Embodiment) is fed back, and the phase difference δ between voltage v1 and voltage v2 is determined. Since the voltage V0 is made constant and it is unloaded, the phase difference δ is also constant thereafter. Subsequently, under the phase difference δ, each of the arms in the AC link bidirectional DC-DC converter 50A is operated with an initial instruction duty (step S10).

Then, a low voltage side current iL1 and a high voltage side current iL2 generated in the operations of each of the arms are measured, a current difference ΔiL is calculated by subtracting the high voltage side current iL2 from the low voltage side current iL1, and a peak value of the current difference ΔiL is obtained (step S20).

Next, the process proceeds to either one of the following three steps depending on the magnitude of the peak value of the current difference ΔiL (step S30).

If the peak value of the current difference ΔiL falls within a range between −20A and 20A, the instruction duty of the gate voltage control device 70 is maintained, and the process ends (step S40).

If the peak value of the current difference ΔiL is larger than 20A, a changed ON period is calculated to be 25 nsec smaller than the ON period corresponding to the existing instruction duty (step S50).

If the peak value of the current difference ΔiL is smaller than −20A, a changed ON period is calculated to be 25 nsec larger than the ON period corresponding to the existing instruction duty (step S60).

A changed duty corresponding to the calculated changed ON period is input to the gate voltage control device 70 (step S70).

The gate voltage control device 70, to which the changed duty has been input, causes each of the arms of the AC link bidirectional DC-DC converter 50A to be operated with the changed duty being as a new instruction duty. Thereafter, this loop is repeated.

Incidentally, although, in steps S50 and S60, the change of the instruction duty is performed with a unit of magnitude change of 25 nsec, the unit of change may be set arbitrarily in consideration of magnitude of the cycle T and the result of the experiments.

According to the foregoing process of Embodiment 1, even when the absolute value of the peak value of the current difference ΔiL is equal to or larger than a predetermined value (20A in this Embodiment) with the initial instruction duty, the peak value can be closer to a predetermined range each time the process proceeds through the loop. Thus, the duty value with which the absolute value of the peak value is smaller than 20A can be obtained swiftly and easily.

In other words, according to Embodiment 1, the peak value of the energizing current in the transformer of the AC link bidirectional DC-DC converter 50A can be suppressed below the predetermined value. As a result, the peak current and the surge voltage of the IGBTs that constitute the AC link bidirectional DC-DC converter 50A can be suppressed, thereby to cause no damage in the IGBTs.

In addition, since the peak value of the energizing current can be suppressed below the predetermined value, the rated current and rated voltage of IGBTs can be selected without overengineering. Therefore, the AC link bidirectional DC-DC converter 50A can be downsized and its manufacturing cost can be reduced.

Although the initial instruction duty can be set to, for example, 50% in step S10, it does not always have to be set to 50%. Another duty (for example 49.9%) other than above can be set as an initial instruction duty on the basis of the results of other inspections or past data, etc. However, the initial instruction duty should be a value in the neighborhood of duty 50%.

Although the output voltage V0 is set to 250V in the foregoing Embodiment 1, it may be possible to set the output voltage V0 arbitrarily, and thereafter to obtain the optimal duty in the process shown in FIG. 11. Also, although the threshold value of the current difference ΔiL is set to 20A, it may be changed arbitrarily.

Embodiment 2

Embodiment 1 concerns an optimal duty determining method suited for the case where the AC link bidirectional DC-DC converter 50A is adjusted only once at the time of inspections, etc. In such a case, an optimal duty is obtained while the output voltage V0 is set to be constant, and the phase difference δ between the voltage v1 and the voltage v2 is set to be constant.

During the operation of a hybrid construction equipment, the phase difference δ between the voltage v1 and the voltage v2 varies greatly depending on the conditions of the operation (power running mode, regeneration mode, or unloaded).

Embodiment 2 concerns an adjusting method by which duties of the arms in an AC link bidirectional DC-DC converter 50A are always the optimal duties even though the phase difference δ varies during the operation of a hybrid construction equipment.

Figure 12:
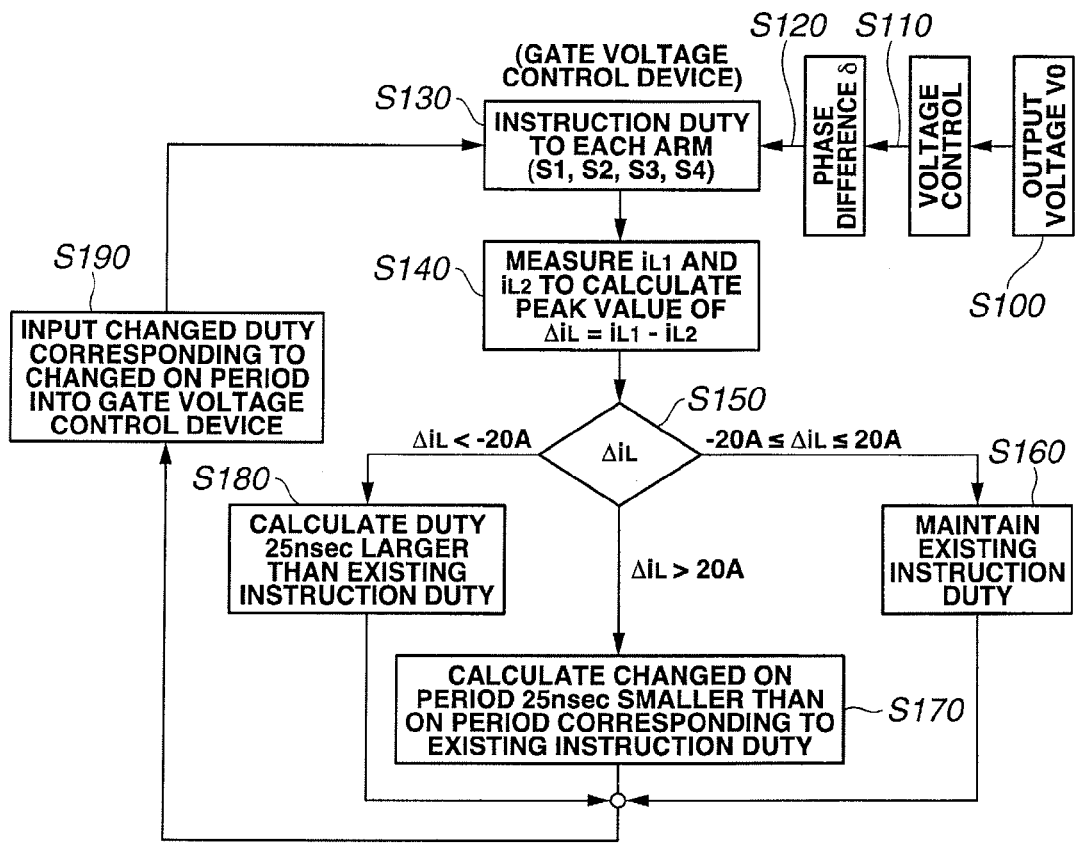
FIG. 12 is a process chart of Embodiment 2.
Figure 13:
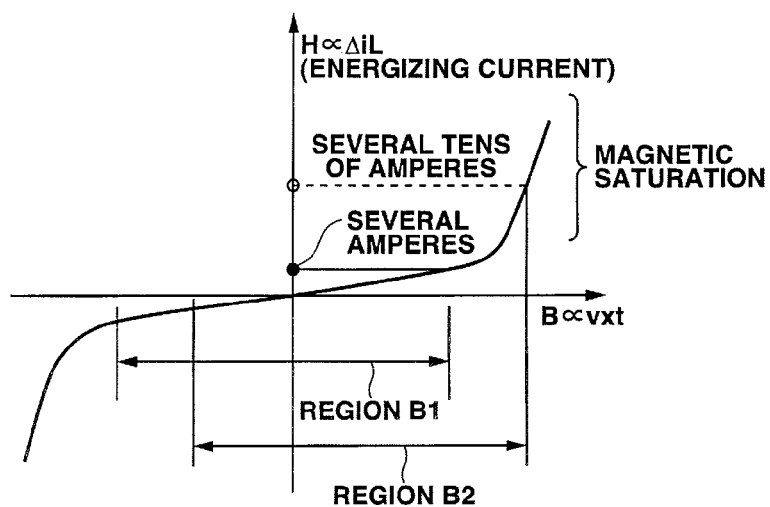
FIG. 13 is a diagram illustrating a B-H curve of a transformer core.

FIG. 12 is a process chart of Embodiment 2 in which the present invention is applied to the AC link bidirectional DC-DC converter 50A that is built in a hybrid construction equipment being in operation.

The voltage V0 of the main power source 10 is not constant but varies up or down depending on the operating conditions. The voltage V0 is being detected constantly (step S100). The detected voltage V0 is fed back to determine the phase difference δ between the voltage v1 and the voltage v2 on the basis of results of judgment as to whether the voltage V0 goes in a direction of an increase or in a direction of a decrease (step 110).

The phase difference δ thus determined is input into the gate voltage control device 70 (step 120).

Then, the gate voltage control device 70 operates each of the arms in the AC link bidirectional DC-DC converter 50A with the input phase difference δ and the initial instruction duty (step S130).

Then, a low voltage side current iL1 and a high voltage side current iL2 generated in the operations of each of the arms are measured, a current difference ΔiL is calculated, and a peak value of the current difference ΔiL is obtained (step S140).

Next, the process proceeds to either one of the following three steps depending on the magnitude of the peak value of the current difference ΔiL (step S150).

If the peak value of the current difference ΔiL falls within a range between −20A and 20A, the instruction duty of the gate voltage control device 70 is maintained (step S160).

If the peak value of the current difference ΔiL is larger than 20A, a changed ON period is calculated to be 25 nsec smaller than the ON period corresponding to the existing instruction duty (step S170).

If the peak value of the current difference ΔiL is smaller than −20A, a changed ON period is calculated to be 25 nsec larger than the ON period corresponding to the existing instruction duty (step S180).

A changed duty corresponding to the calculated changed ON period is input to the gate voltage control device 70 (step S190).

The gate voltage control device 70, to which the changed duty has been input, causes each of the arms of the AC link bidirectional DC-DC converter 50A to be operated with the changed duty being as a new instruction duty and under the phase difference δ. Thereafter, this loop is repeated.

Incidentally, in steps S170 and S180, the change of the instruction duty is performed with a unit of magnitude change of 25 nsec. However, the unit of change may be set arbitrarily in consideration of magnitude of the cycle T and the result of the experiments, which is the same as in Embodiment 1.

According to Embodiment 2, even when the absolute value of the peak value of the current difference ΔiL is equal to or larger than a predetermined value (20A in this Embodiment) with the initial instruction duty, the peak value can be closer to a predetermined range each time the process proceeds through the loop. Thus, the duty value with which the absolute value of the peak value is smaller than 20A can be obtained swiftly and easily.

As a result, the peak current and the surge voltage of the IGBTs that constitute the AC link bidirectional DC-DC converter 50A can be suppressed, thereby to cause no damage in the IGBTs.

In addition, since the peak value of the energizing current can be suppressed below the predetermined value, the rated current and rated voltage of IGBTs can be selected without overengineering. Therefore, the AC link bidirectional DC-DC converter 50A can be downsized and its manufacturing cost can be reduced.

In addition, the duty for each of the aims can be changed all at once by an instruction signal from the gate voltage control device 70. Therefore, even when, for example, a hybrid construction equipment is being in operation, it is possible to change each duty easily and yet swiftly so that the absolute value of the peak value of the energizing current can always be suppressed below a predetermined value.

Incidentally, in the above Embodiments, a ratio of the number of turns for the primary side and the secondary side of the transformer 50D is set to one to one. However, the ratio of the number of turns of the transformer 50D may be set to other values.

Specifically, in the case where it is so configured that a ratio of the number of turns for the transformer 50D of the AC link bidirectional DC-DC converter 50A is set to N1 to N2, the current difference $\Delta iL$ can be obtained from an equation $\Delta iL = iL1 - \alpha iL2$, where $\alpha = N1/N2$, by detecting the low voltage side current iL1 and the high voltage side current iL2 with current sensors. In this case, the low voltage side current iL1 and the high voltage side current iL2 cannot be measured in one lump by a clamp meter or the like. Therefore, it is necessary to measure these current values with two current sensors, respectively.

The present invention can be applied not only to hybrid construction equipment as being applied in the Embodiments, but also to electric motor cars or the like that use a hybrid power supply system.

The invention claimed is:

1. A switching control method of a transformer coupled booster, wherein the transformer coupled booster comprises a primary inverter, a secondary inverter and a transformer, the primary inverter
including four IGBTs bridging-connected to a primary coil of the transformer, and diodes each connected in parallel to respective one of the IGBTs with polarity thereof being opposite to that of the IGBTs, and
being constituted by a first arm that turns ON/OFF two of the IGBTs simultaneously, and a second arm that turns ON/OFF other two of the IGBTs simultaneously, the first arm and the second arm being turned ON/OFF alternately, the secondary inverter
including four IGBTs bridging-connected to a secondary coil of the transformer; and diodes each connected in parallel to respective one of the IGBTs with polarity thereof being opposite to that of the IGBTs, and
being constituted by a third arm that turns ON/OFF two of the IGBTs simultaneously, and a fourth arm that turns ON/OFF other two of the IGBTs simultaneously, the third arm and the fourth arm being turned ON/OFF alternately, the primary inverter being connected in series to the secondary inverter in such a manner that a positive terminal of the primary inverter and a negative terminal of the secondary inverter constitute additive polarity, and the primary inverter being linked to the secondary inverter by the transformer, the method comprising:
detecting a primary coil current flowing through the primary coil of the transformer and a secondary coil current flowing through the secondary coil of the transformer, respectively;

obtaining a peak value of a current difference between the detected primary coil current and the detected secondary coil current; and changing ON period and OFF period of the four arms according to a result of comparison between the obtained peak value of the current difference and a predetermined threshold value, wherein the ON period and the OFF period for each of the arms are changed so that the ON period of the first arm and the third arm decreases when the current difference is larger than a preset threshold current value (Ac), the ON period and the OFF period for each of the arms are changed so that the ON period of the first arm and the third arm increases when the current difference is smaller than a negative value of the threshold current value (−Ac), and the ON period of the first arm and the third arm is maintained when the current difference falls within a range between the negative value of the threshold current value (−Ac) and the threshold current value (Ac).

2. The switching control method of a transformer coupled booster according to claim 1, wherein a cycle of the ON period and the OFF period for each of the arms is maintained constant, and the ON period and the OFF period for each of the arms are changed so that a ratio of the ON period and the OFF period for the first arm is always equal to a ratio of the ON period and the OFF period for the third arm.

3. The switching control method of a transformer coupled booster according to one of claims 1 and 2, wherein the change in the ratio of the ON period and the OFF period for each of the arms is carried out all at once by an instruction signal.

4. A switching control method of a transformer coupled booster, wherein the transformer coupled booster comprises a primary inverter, a secondary inverter and a transformer, the primary inverter
including four IGBTs bridging-connected to a primary coil of the transformer, and diodes each connected in parallel to respective one of the IGBTs with polarity thereof being opposite to that of the IGBTs, and
being constituted by a first arm that turns ON/OFF two of the IGBTs simultaneously, and a second arm that turns ON/OFF other two of the IGBTs simultaneously, the first arm and the second arm being turned ON/OFF alternately, the secondary inverter
including four IGBTs bridging-connected to a secondary coil of the transformer; and diodes each connected in parallel to respective one of the IGBTs with polarity thereof being opposite to that of the IGBTs, and
being constituted by a third arm that turns ON/OFF two of the IGBTs simultaneously, and a fourth arm that turns ON/OFF other two of the IGBTs simultaneously, the third arm and the fourth arm being turned ON/OFF alternately, the primary inverter being connected in series to the secondary inverter in such a manner that a positive terminal of the primary inverter and a negative terminal of the secondary inverter constitute additive polarity, and the primary inverter being linked to the secondary inverter by the transformer, the method comprising:
detecting a primary coil current flowing through the primary coil of the transformer and a secondary coil current flowing through the secondary coil of the transformer, respectively;
calculating a current difference between the detected primary coil current and the detected secondary coil current; and
changing ON period and OFF period of the four arms based on the calculated current difference, wherein
the ON period and the OFF period for each of the arms are changed so that the ON period of the first arm and the third arm decreases when the current difference is larger than a preset threshold current value (Ac),
the ON period and the OFF period for each of the arms are changed so that the ON period of the first arm and the third arm increases when the current difference is smaller than a negative value of the threshold current value (−Ac); and
the ON period of the first arm and the third arm is maintained when the current difference falls within a range between the negative value of the threshold current value (−Ac) and the threshold current value (Ac).

5. The switching control method of a transformer coupled booster according to claim 4, wherein
a cycle of the ON period and the OFF period for each of the arms is maintained constant, and the ON period and the OFF period for each of the arms are changed so that a ratio of the ON period and the OFF period for the first arm is always equal to a ratio of the ON period and the OFF period for the third aim.

6. The switching control method of a transformer coupled booster according to claim 4, wherein
the change in the ratio of the ON period and the OFF period for each of the arms is carried out all at once by an instruction signal.

* * * * *